UNITED STATES PATENT OFFICE.

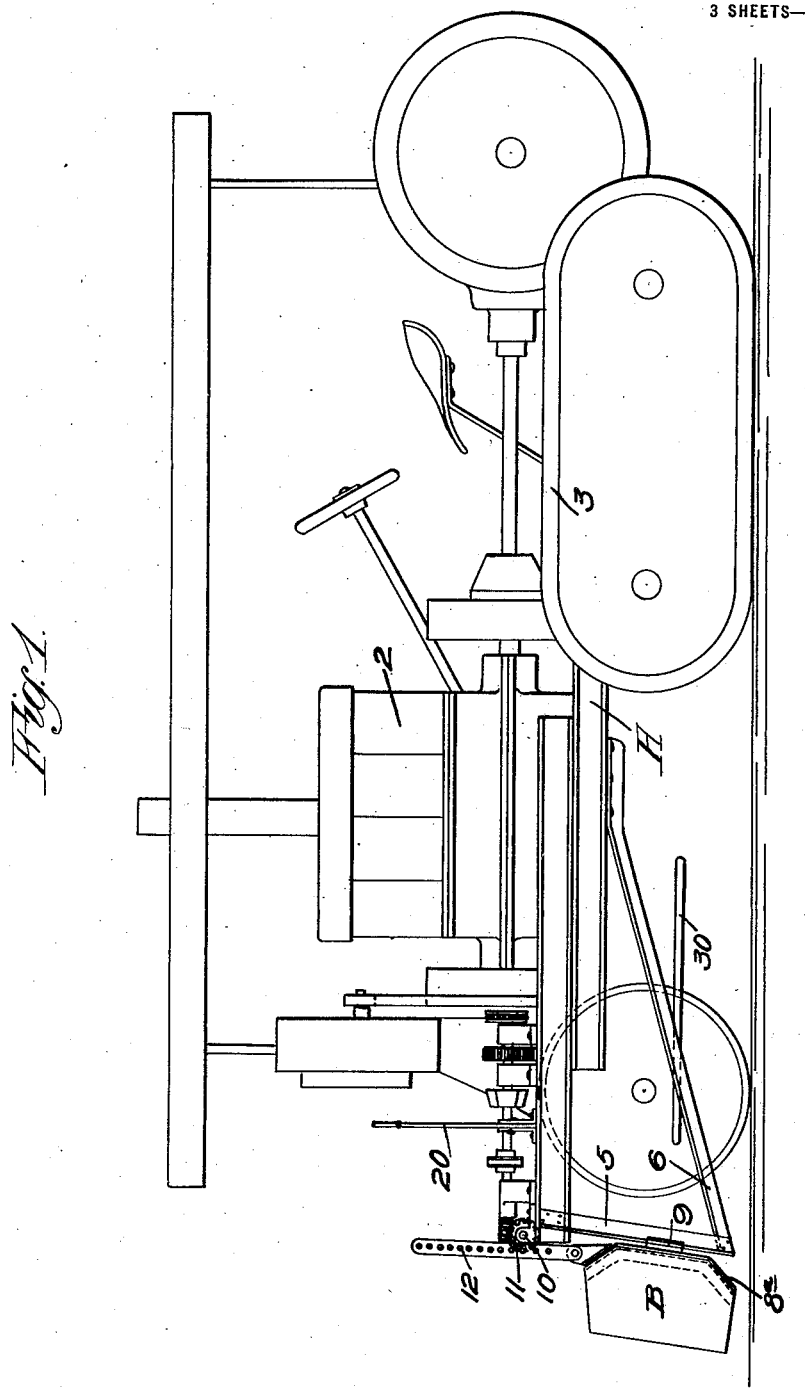

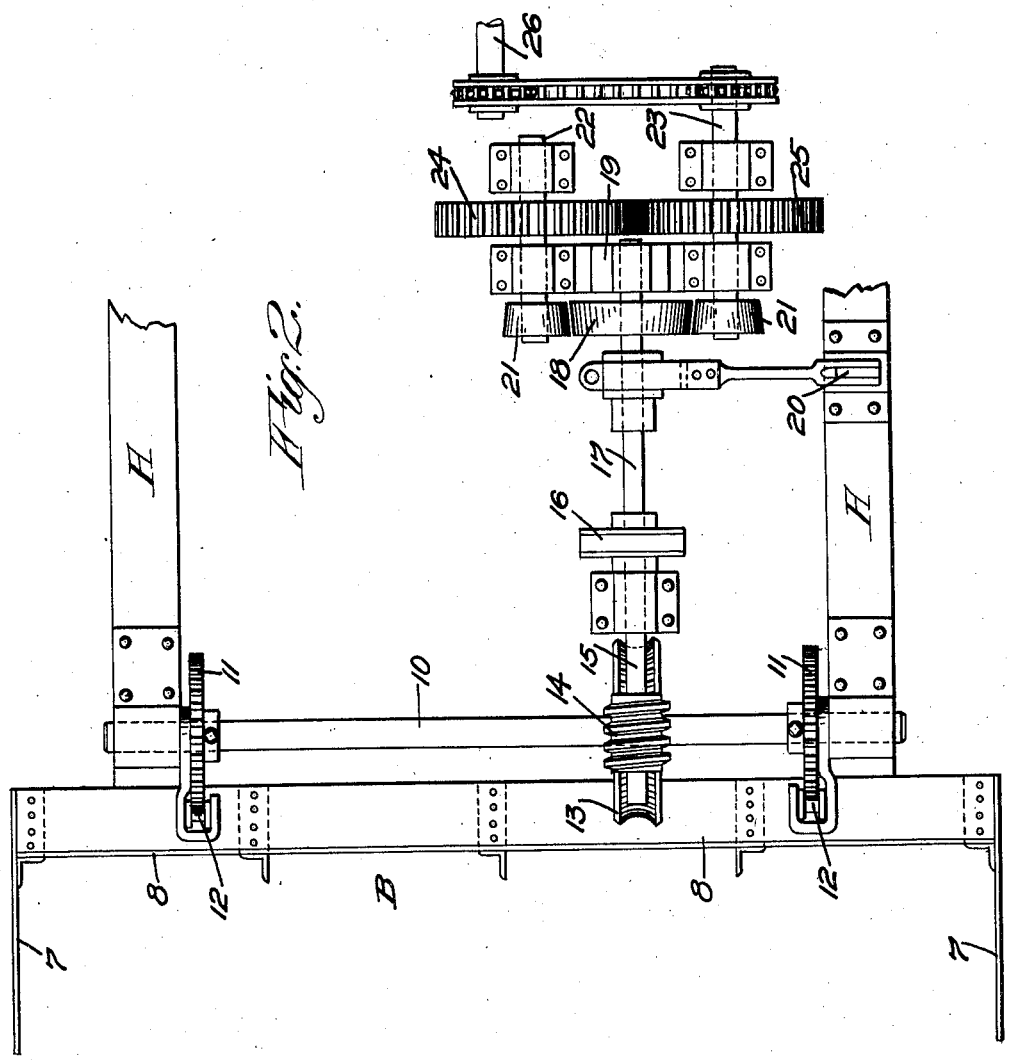

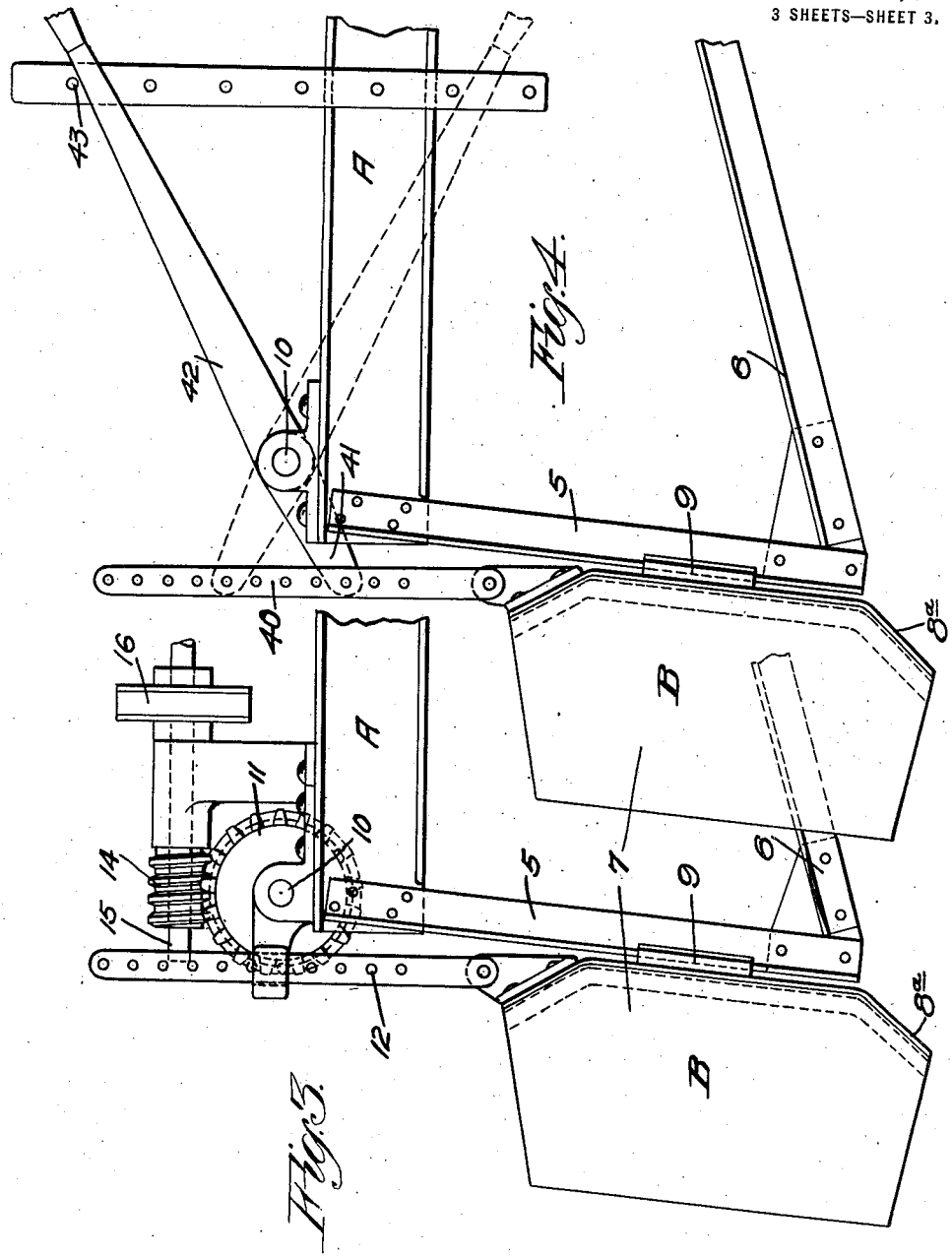

LEWIS D. HOPFIELD, OF NATOMA, CALIFORNIA.

LAND-LEVELING DEVICE.

1,332,872.  Specification of Letters Patent.  Patented Mar. 2, 1920.

Application filed June 13, 1918. Serial No. 239,864.

*To all whom it may concern:*

Be it known that I, LEWIS D. HOPFIELD, a citizen of the United States, residing at Natoma, in the county of Sacramento and State of California, have invented new and useful Improvements in Land-Leveling Devices, of which the following is a specification.

This invention relates to a land leveling device.

One of the objects of the present invention is to provide a simple, substantial and easily operated scraper which is particularly adapted for road work, land leveling and the like, and which is so constructed that it can be readily operated and carried by a tractor or any similar power driven machine. Another object of the invention is to provide means for adjusting the position of the scraper vertically with relation to the main frame of the tractor and to support and secure the scraper when so adjusted. Further objects will hereinafter appear.

The invention consists of the parts and the construction, combination and arrangement of parts as hereinafter more fully described and claimed, having reference to the accompanying drawings, in which—

Figure 1 is a side elevation of a tractor showing the application of the invention.

Fig. 2 is a plan view showing means for transmitting power from the motor on the tractor to raise and lower the scraper.

Fig. 3 is a side elevation of Fig. 2.

Fig. 4 is a view similar to Fig. 3 showing a manually operated mechanism for raising and lowering the scraper and for securing it when so adjusted.

Referring to the drawings in detail, A indicates the main frame of a tractor, which, in this instance, is driven by a pair of endless self-laying tracks, such as indicated at 3, and steered in any suitable manner, or, as here shown, by a front wheel. Suitably secured to the forward end of the main frame is a pair of downwardly extending guide bars 5 which are rigidly secured by means of angle iron braces 6, or the like. Slidably mounted on said guide bars is a scraper generally indicated at B.

This scraper consists of a pair of end sections 7 and a scraping plate 8 to which the end plates 7 are secured, shoes 9 being secured on the rear side of the plate to embrace the guide bars 5 and to guide the scraper proper vertically with relation to the main frame. Journaled crosswise of the main frame A is a shaft 10 and secured on each end of the shaft is a gear 11 which is adapted to intermesh with rack bars 12 secured to the scraper. Secured approximately midway between the gears 11 is a worm gear 13 and intermeshing with said gear is a worm 14 which is secured upon a shaft 15. This shaft is suitably supported in journals carried by the main frame and is connected by means of a universal joint 16 with a friction driven shaft 17.

This shaft carries a friction pulley 18 and it is mounted in a sliding journal 19 operated by means of a lever 20 to permit the pulley 18 to be brought into engagement with one or another of a pair of driving pulleys 21. These pulleys are secured on shafts 22 and 23 respectively journaled in bearings secured to the main frame and said shafts are driven in unison, but in opposite directions, by providing intermeshing gears 24 and 25, shaft 23 being driven from the main motor shaft 26 in any suitable manner, or, as here shown, by a Morse chain drive. Shafts 22 and 23 revolve in unison, but in opposite directions, when the motor 2 is operated, as power is constantly transmitted thereto through the chain drive shown. Shafts 15 and 17 will, however, remain stationary as long as the pulley 18 remains out of engagement with the driving pulleys 21, but power may be transmitted to revolve the connected shafts 15 and 17 at any time desired by merely rocking the lever 20 in one direction or another, as this movement swings the pulley into frictional engagement with one or another of the pulleys 21. The worm 14 may therefore be driven in one direction or another, thereby transmitting power to turn the shaft 10 in one direction or another, thus raising or lowering the scraper proper with relation to the main frame, as the gears 11 remain in constant mesh with the rack bars 12. The scraper will remain either lowered or raised, or at any intermediate point, the moment the pulley 18 is released as the worm gear transmission provided serves as a lock to secure the scraper in any adjusted position desired.

In actual operation, when building roads or leveling land, it can readily be seen that it is only necessary for the operator to lower the scraper for any depth of cut desired. Power is then transmitted through the propelling tracks 3 to drive the tractor in a forward direction. The dirt or other material to be handled will thus pile up in front of the scraper and may be conveyed to any point desired. The scraper may be elevated, if necessary, to release the dirt scraped up in front thereof and the tractor may continue in a forward direction or it may back away from the load, if desired, in this instance rendering it more or less unnecessary to adjust the position of the scraper as when backing up preparatory to starting a new cut. The scraper will not back up the material over the ground due to the incline 8ª formed on the lower edge of the scraper. The operating lever 20 may be connected by links or other suitable means so that it may be handled directly from the driver's seat, or it may be handled directly from a platform secured on the side of the tractor, as indicated at 30.

By placing the scraper on the front of the machine it is possible for the operator to see the ground ahead, thereby rendering it easier for the operator to work the ground or gather the material to be handled. The load can be carried along, dumped or distributed as desired; any depth of cut desired can be obtained; and the scraper proper can be loaded at the will of the operator as it may be raised or lowered by the power drive shown in Figs. 2 and 3 or by a manual control, such as shown in Fig. 4. In this instance, it is only necessary to attach the scraper to a pair of links 40, which, in turn, are carried by a pair of crank arms 41 secured on the shaft 10, said shaft being in turn operated by means of a lever 42 which may be locked in any position desired by bringing it into engagement with the pins shown at 43.

While a tractor of the self-laying track type is here shown I wish it understood that any other type of power driven machine may be employed; also that the materials and finish of the scraper and the operating mechanism employed may be such as the experience and judgment of the manufacturer may dictate.

Having thus described my invention, what I claim and desire to secure by Letters Patent is:

1. A land leveling device comprising a tractor, an auxiliary frame secured to the main frame of the tractor and at the front thereof, a pair of vertically disposed guide rails secured on the auxiliary frame, a pair of shoes positively engaging said rails and slidable thereon, a scraper to which the shoes are attached, a pair of rack bars pivotally connected with the scraper and from which the scraper is hung, a shaft journaled crosswise of the frame, a pair of gears secured on the shaft and intermeshing with the respective rack bars, and means for transmitting engine power to rotate the shaft.

2. A land leveling device comprising a tractor, an auxiliary frame secured to the main frame of the tractor and at the front thereof, a pair of vertically disposed guide rails secured on the auxiliary frame, a pair of shoes positively engaging said rails and slidable thereon, a scraper to which the shoes are attached, a pair of rack bars pivotally connected with the scraper and from which the scraper is hung, a shaft journaled crosswise of the frame, a pair of gears secured on the shaft and intermeshing with the respective rack bars, means for transmitting engine power to rotate the shaft, and a pair of guide brackets on the auxiliary frame through which the upper ends of the rack bars extend and by which they are retained in positive mesh with their respective gears.

3. A land leveling device including a tractor, a guide frame secured to the main frame of the tractor at the front end, a scraper vertically slidable upon the guide frame and positioned at right angles to the line of travel, a pair of rack bars secured to the scraper, a shaft journaled transversely of the main tractor frame and gears on the shaft intermeshing with the rack bars, a shaft journaled longitudinally of the apparatus, and a moving gear thereon transmitting action to the first named shaft and rack bars, a drive shaft in line with the second shaft with a universal joint connection and a sliding bearing box, an actuating lever, a friction wheel upon the shaft, parallel shafts with intermeshing gears turning said shafts in opposite directions, friction wheels upon said shafts, with which the intermediate wheel may be brought in contact to raise or lower the scraper, and connection between said shafts and a motor.

4. The combination with the main frame of a tractor and an engine for driving the tractor of a guide frame mounted on the forward end of the tractor, a scraper carried by the guide frame and vertically slidable thereon, a pair of rack bars attached to the scraper, a shaft journaled crosswise of the main frame, a pair of gears on said shaft intermeshing with the rack bars, a pair of friction pulleys adapted to be driven in opposite directions by the engine on the tractor, an intermediate friction pulley adapted to be brought into frictional engagement with either of said first-named pulleys, a shaft driven by said intermediate pulley, a worm on said shaft intermeshing with a worm gear on the first-named shaft and manually controlled means for moving the intermediate friction pulley into and out of engagement with the first-named pulleys.

In testimony whereof I have hereunto set my hand in the presence of two subscribing witnesses.

LEWIS D. HOPFIELD.

Witnesses:
CHARLES M. ROMANOWITZ,
JOHN CROUCH.